United States Patent [19]
Jones

[11] 3,708,934
[45] Jan. 9, 1973

[54] AIRCRAFT HANGAR STRUCTURE

[75] Inventor: Jack Jones, Wichita, Kans.

[73] Assignee: Cessna Aircraft Company, Wichita, Kans.

[22] Filed: July 8, 1971

[21] Appl. No.: 160,873

[52] U.S. Cl. ...............................................52/237
[51] Int. Cl. ...............................................E04h 6/44
[58] Field of Search........................................52/237

[56] References Cited

UNITED STATES PATENTS

| | | | |
|---|---|---|---|
| 1,837,152 | 12/1931 | Ellsworth | 52/237 |
| 2,420,186 | 5/1947 | Miller | 52/237 |
| 3,543,455 | 12/1970 | Walsh | 52/237 |

*Primary Examiner*—John E. Murtagh
*Attorney*—Hubert T. Mandeville et al.

[57] ABSTRACT

A six-sided aircraft hangar structure of regular hexagonal cross section having three flat, planar, overhead canopy doors disposed in alternate walls thereof is disclosed herein. The roof of the new structure is centrally supported by a six-sided central module of regular hexagonal cross section, the apices of which module are disposed opposite the midpoints of the hexagonal hangar walls. The roof is laterally supported by six columns and the hangar walls themselves. This unique arrangement provides a large, unobstructed, accessible space for the accommodation of a large number of aircraft, each of which may be independently moved into and out of the hangar through one of the three canopy doors. The central module itself is multi-tiered, providing office and service space for personnel. The design of the structure is such that it may be fabricated efficiently and inexpensively with conventional, simple techniques from readily available flat construction materials.

6 Claims, 4 Drawing Figures

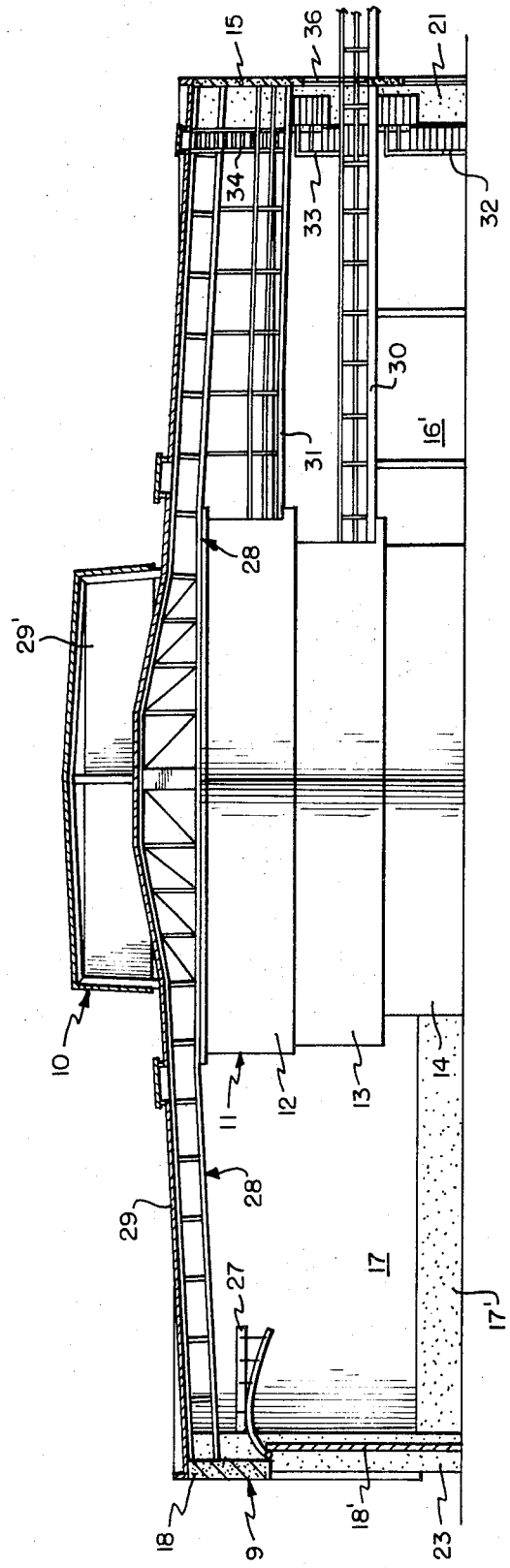

AIRCRAFT HANGAR STRUCTURE

RELATION TO COPENDING APPLICATION

The disclosure herein is related to copending application Ser. No. D25,732, filed Oct. 30, 1970, for "Aircraft Service Structure."

BACKGROUND OF THE INVENTION

The airplane hangar art is developing rapidly and includes a plethora of constructions in a wide variety of geometrical configurations. Representative of the state of the art are U. S. Pat. No. 3,153,302; No. 3,075,654; No. 3,153,303; No. 3,543,461; and No. 3,543,455.

While the state of the art structures and the state of the art patents disclose many worthwhile hangar designs, no designs have been available to the art heretofore which provide an efficient structure for housing a plurality of medium-sized commercial "general aviation" aircraft while simultaneously and efficiently providing office facilities and service facilities for maintaining, repairing, and vending the aircraft or type of aircraft housed within the hangar structure. Accordingly, it is to the design of a new and improved, economical to erect, attractive structure for housing a plurality of aircraft in an efficient manner, which also includes adequate and efficiently utilized space for servicing, selling, displaying, and maintaining said aircraft, that the present invention is directed.

SUMMARY OF THE PRESENT INVENTION

The present invention is directed to a compound structure suited for housing, service, maintenance, and display of six jet "general aviation" aircraft of the type presently manufactured and sold by Cessna Aircraft Company under the registered trademark designation "Citation" series 500, which aircraft have a wing span of approximately 44 feet and a length of approximately 42 feet, and, therefore, may be situated within a circular area having a diameter of approximately 23 feet. The new structure is comprised of a central module in the general shape of a hexagonal prism, providing office space, repair shops, sales areas, etc., which functions as the hub of a surrounding hangar also in the general shape of a hexagonal prism. The central module is arranged in a manner whereby the apices of the central module face the centers of each of the hangar side walls, i.e., the apices of the central module are offset 30° from the apices of the hexagonal cross section of the hangar walls.

More specifically, the aforementioned construction provides unobstructed, independently accessible parking spaces for six aircraft of the "Citation" class around the central module. Access to the central module may be obtained directly from the exterior of the structure by an elevated ramp which passes above the parking area of the aircraft and links the central module with the airport areas outside of the hangar.

As a more specific and a very important aspect of the present invention, movement of any one of six parked aircraft within the structure may be had independently of the other parked aircraft by the provision of three flat, canopy doors in alternate sides of the structure. Thus, each door provides independent ingress and egress for two aircraft.

Of extreme importance to the efficacy of the new design is the readiness with which it may be erected, using known, uncomplicated techniques, with essentially flat, inexpensive and easy to handle construction materials.

For a more complete understanding of the present invention and a better appreciation of its attendant advantages, reference should be made to the following detailed description of the invention taken in conjunction with the accompanying drawings.

DESCRIPTION OF THE DRAWINGS

FIG. 4 is a vertical, cross-sectional view of the new structure taken along line 4—4 of FIG. 3.

DETAILED DESCRIPTION OF THE INVENTION

In accordance with the principles of the invention, a new aircraft sales/service structure 10 having a large volume of efficiently usable space is provided using straight line geometric figures and flat plane geometric solids. The large usable space provides more inside maneuverability for individual aircraft and more usable space in the interior of the new structure for auxiliary functions such as sales and service of aircraft than has heretofore been available in comparably sized buildings. Moreover, the regular hexagonal cross section of the exterior of the new structure adapts it for modular, multiple constructions utilizing a plurality of similarly shaped modules which may be linked together along flat walls of the structure.

Figure 2:
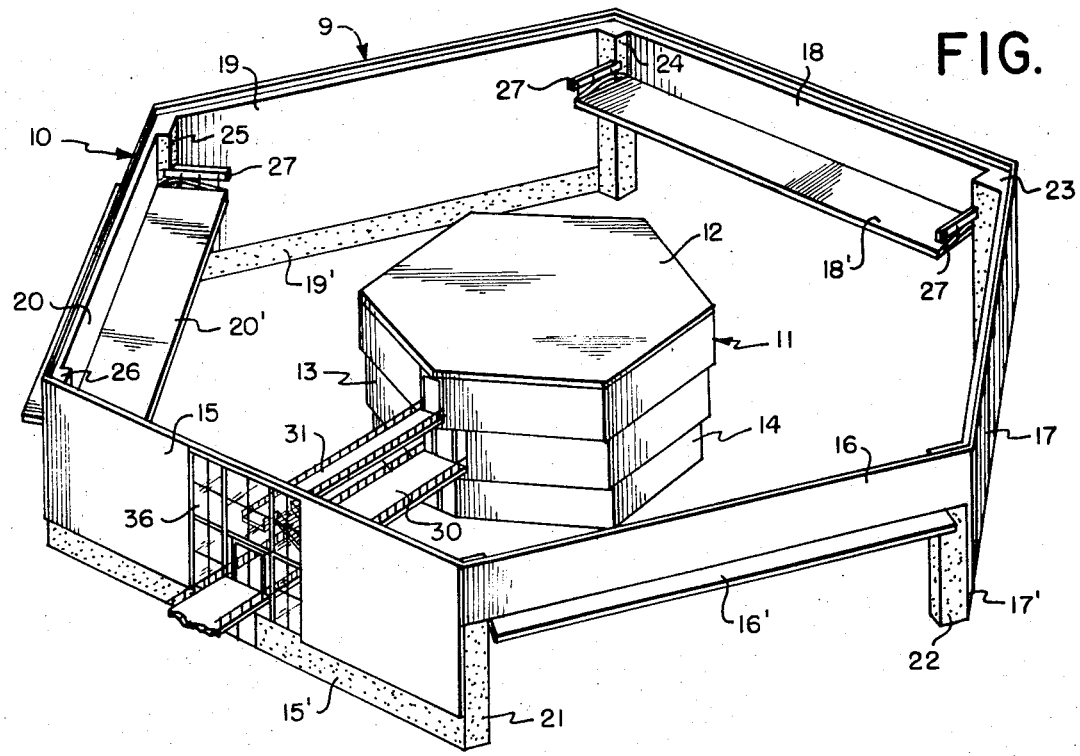
FIG. 2 is a perspective view of the structure shown in FIG. 1, with the roof removed to show details of construction and arrangement of the central hexagonal module within the hexagonal exterior walls, in accordance with the principles of the present invention.
Figure 3:
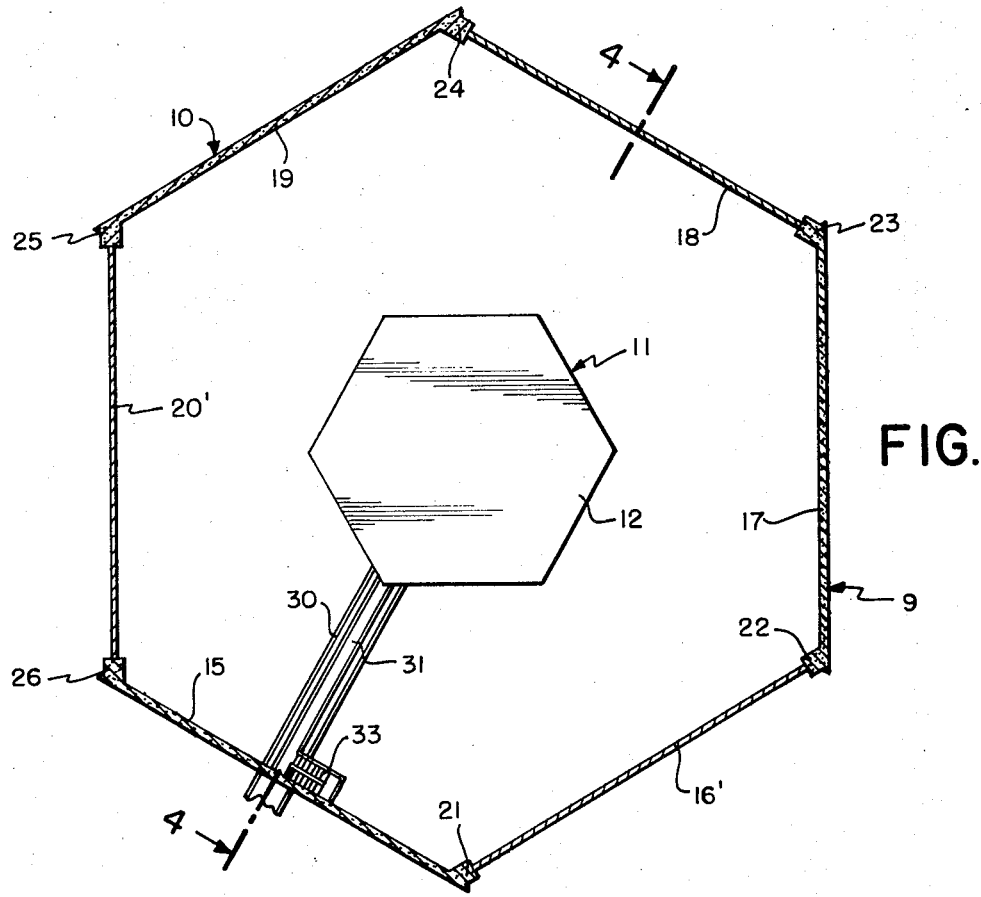
FIG. 3 is a horizontal, cross-sectional view of the structure of the invention.

Referring to FIG. 2, the new sales/service structure 10 includes a generally six-sided, central module 11 comprised of three tiers of descending size (from top to bottom) but similar shape. The upper tier 12 slightly overhangs the intermediate tier 13, which slightly overhangs the lower tier 14, as shown. In accordance with the principles of the invention, the central module 11 is surrounded by a hangar 9 having side walls 15-20 which are arranged hexagonally and have their midpoints opposite to the apices of the central module 11, as shown best in FIG. 3. The hangar walls 15, 17, and 19 are flat and are supported between six columns 21-26 and by horizontal concrete foundations 15', 17', 19'.

As a most important aspect of the present invention, alternate side walls 16, 18 and 20 are formed primarily of large canopy doors 16', 18', 20', which are in the nature of flat, planar rectangles of approximately 20 ft. by 80 ft. in size, and which doors extend between pairs of columns 21, 22; 23, 24; 25, 26 for the full width of three sides of the hangar. The doors are pivotably hung on frames 27 (see FIG. 4) supported on each of the columns 21-26. As shown in FIG. 2, the canopy doors when pivoted to their elevated position, in which they are suspended horizontally beneath the fixed, uppermost portions of the walls 16, 18 and 20, effectively, completely open an entire side of the hangar 9. The construction and support of overhead canopy doors is well known and need not be described in further detail herein, although it should be understood that the employment of flat canopy doors and flat construction materials represents a critical and important feature of the present invention.

As a further important aspect of the invention, a generally planar, hexagonal roof 29 is supported on roof trusses 28 which extend between the central module 11 and each of the six columns 21–26. The roofing for the roof 29, as well as the siding for the walls 15, 17, 19 and the uppermost wall portions 16, 18, 20, are chosen from conventional, readily available, economical, easy to install flat materials. As will be appreciated and in accordance with the principles of the invention, the floor space of the hangar 9 is completely unobstructed by any roof supporting structure.

Entrance to the central service module 11 may be had directly from the hangar service floor and/or from a bridge 30 suspended above the hangar floor between the wall 15 and the tier 13. A catwalk 31 is disposed above the bridge for entrance to the uppermost tier 12. Both the catwalk 31 and bridge 30 provide observation decks for viewing aircraft parked below. As shown best in FIG. 4, steps 32 lead directly from the hangar 9 to the bridge; steps 33 lead from the bridge 30 to the catwalk 31; and steps 34 lead from the catwalk 31 to the roof 29.

Figure 1:
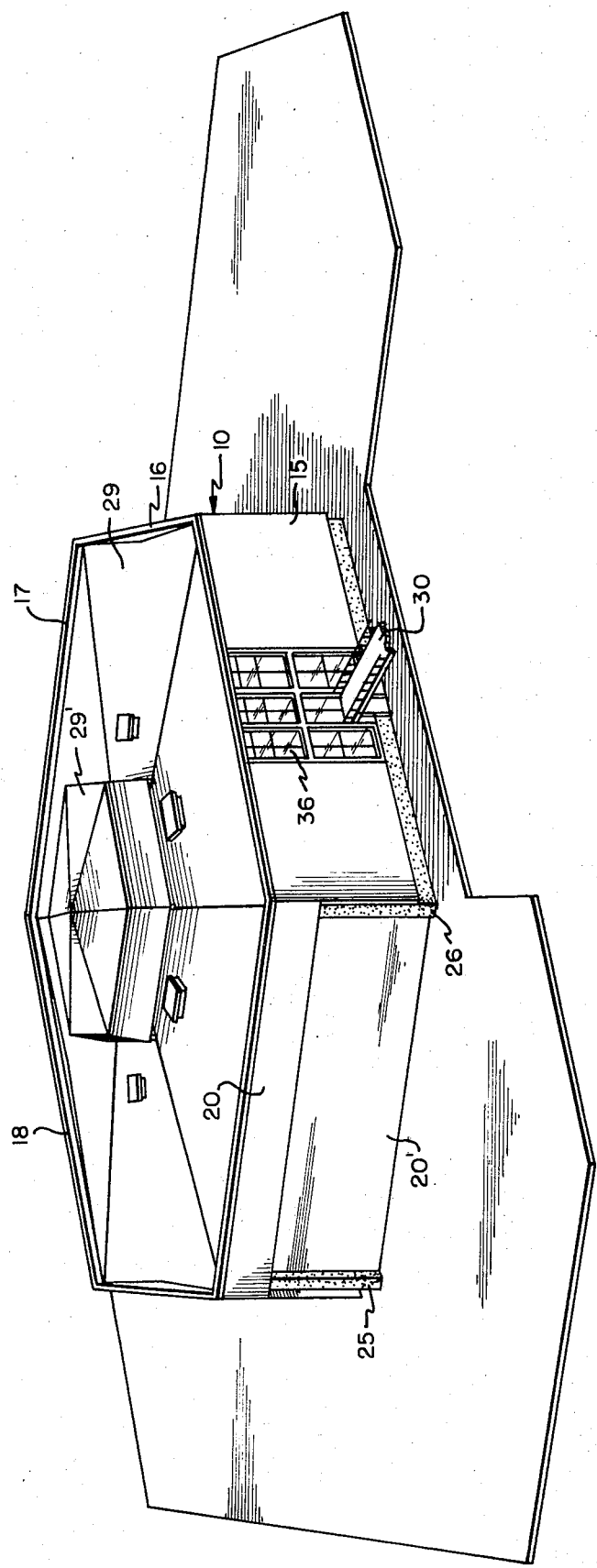
FIG. 1 is a perspective view of the exterior of the new hangar structure with a surrounding apron.

Advantageously and as shown in FIG. 1, one or more of the walls, 15, 17, or 19 may include large glass windows 36 to provide some degree of natural lighting to the interior of the new structure. Likewise, the side walls 12', 13', 14' of each of the tiers of the module may include large windows for observation of parked aircraft and some degree of natural lighting. As will be understood, the walls 15 or 17 may be used to link an identical modular sales/service structure, if it is desired to cluster several of the new structures together to form a larger complex or chain of connected hexagonal structures. As also shown in FIG. 1, the roof 29 has an expanded central portion 29' for enclosing mechanical equipment for air conditioning and the like.

In the illustrated new sales/service structure 10, which provides six parking spaces for "Citation" class aircraft, each of the hangar walls 15–20 is approximately 30 ft. by 80 ft.; each of the lower tier central module walls 14' is approximately 27 ½ ft. long; each of the intermediate tier module walls 13' is approximately 28 ½ ft. long; and each of the upper tier module walls 14' is 29 ¼ ft. long; each of the tiers is approximately 10 ft. high.

It should be understood, of course, that the sales/service structure herein illustrated and described is intended to be representative only, as certain changes may be made therein without departing from the clear teachings of the disclosure. Accordingly, reference should be made to the following appended claims in determining the full scope of the invention.

I claim:

1. An aircraft hangar/service structure, comprising
 a. first, second, third, fourth, fifth and sixth vertical columns equiangularly and equidistantly arrayed about a central point to define the apices of a regular hexagon;
 b. a central multi-tiered module of sufficient size to house a plurality of offices and the like, said module having a regular hexagonal cross section disposed with its central vertical axis passing through said central point;
 c. each of the tiers of said module being in the general form of a hexagonal prism;
 d. the apices of each of said tiers being disposed directly opposite to the midpoints between adjacent pairs of said columns;
 e. a plurality of truss structures radiating from said central module to said columns and being supported therebetween;
 f. pairs of said columns comprising said first and second, third and fourth, fifth and sixth columns, supporting flat walls therebetween formed from flat construction materials;
 g. alternate pairs of said columns comprising said second and third, fourth and fifth, and sixth and first columns, having canopy door support means carried thereby;
 h. canopy door means of length not substantially less than the spacing between columns mounted for pivotable movement between a vertical closed position and a generally horizontal open position;
 i. flat wall means supported between said alternate pairs of columns above said canopy doors;
 j. a generally hexagonal roof completely covering the hexagonal area defined by said wall means;
 k. said roof being comprised of flat roofing materials supported by and between said trusses;
 l. said wall means, canopy doors, and roof thereby defining an open, readily accessible, unobstructed hangar space about said central module.

2. The hangar/service structure of claim 1, in which
 a. said canopy doors are approximately eighty feet in length.

3. The hangar/service structure of claim 2, in which
 a. said doors are at least twenty feet in height.

4. The hangar/service structure of claim 1, in which
 a. at least one of said wall means includes a window therein.

5. The hangar/service structure of claim 1, further including
 a. a bridge means extending between one of said walls and an elevated tier.

6. The hangar/service structure of claim 5, in which
 a. said central module includes upper, intermediate, and lower tiers;
 b. said bridge is horizontal and communicates between an opening in one of said wall means and said intermediate tier;
 c. a horizontal catwalk is disposed above said bridge at the level of and communicating with said upper tier;
 d. flights of step means lead from ground level to said bridge and from said bridge to said catwalk and from said catwalk to said roof.

* * * * *